March 1, 1955
C. D. YOUNG
2,703,018
INSTRUMENT FLOAT CONNECTION
Filed March 14, 1951
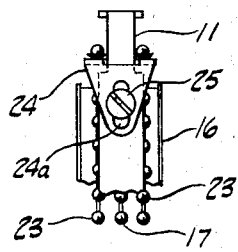
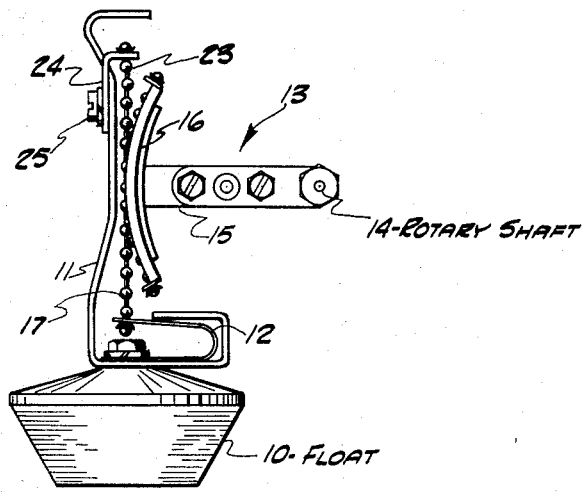
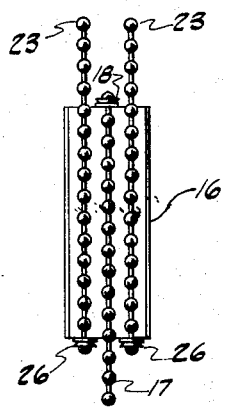
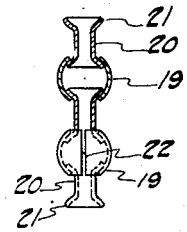
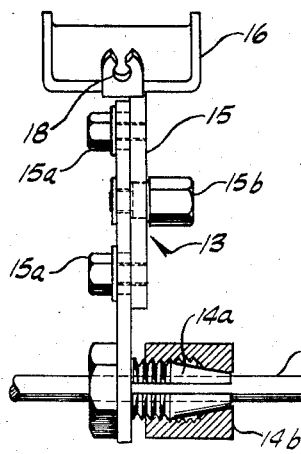
INVENTOR.
CLAUDE D. YOUNG
BY
Curtis, Morris + Safford
ATTORNEYS United States Patent Office 2,703,018
Patented Mar. 1, 1955

2,703,018

INSTRUMENT FLOAT CONNECTION

Claude D. Young, Foxboro, Mass., assignor to The Foxboro Company, Foxboro, Mass., a corporation of Massachusetts Application March 14, 1951, Serial No. 215,613

2 Claims. (Cl. 74—108)

This invention relates to control, indicating or recording instruments and has particular reference to devices in such instruments in which the level, or height of a liquid is a factor.

Specifically, this invention is a device for translating movement of a float into rotary movement of a shaft. An example of its use is in a differential gauge of the float type, such as is commonly used for measuring the differential pressure in a fluid developed by means of an orifice meter or the like.

The object of this invention is to provide a new and improved device of this nature.

It has been a problem in such a device to connect a float with a rotary shaft so that movement of the float with rise and fall of the liquid, will produce a positive and proportional rotation of the shaft. The float needs to have a certain freedom of movement laterally of the liquid surface in order that it may freely find its own floating level. Various connections between such a float and rotary shaft have had the disadvantage of unduly restricting such lateral movement of the float.

This invention has a marked improvement in this matter in that it provides a connection between the float and the rotary shaft which is arranged and formed to permit sufficient lateral movement of the float on the surface of the liquid, while maintaining a positive and proportional relation between the vertical movement of the float and the rotary movement of the shaft.

Referring to the drawings:

Figure I is an elevation showing generally a device embodying this invention;

Figure II is a view of a portion of the device of Figure I, illustrating a chain connection arrangement therein;

Figure III is a detail, in partial section, of the preferred construction of the chains of Figures I and II;

Figure IV is a showing of an arrangement involving an alternate structure involving an arm connection to the shaft which is to be rotated;

Figure V is a plan view of an arm and pivot portion of the device of Figure I; and Figure VI is a showing of a chain connection portion of the device of Figure I, in elevation as from the left of Figure I.

Referring to Figure I, at the bottom thereof, a solid float 10 is shown, generally in the form of a round, covered cup. In operation, this float rests on a liquid which rises and falls in accordance with changes in a variable condition. For a showing of a similar structure, reference is made to Patent No. 1,686,263 to E. H. Bristol, dated October 2, 1928.

Secured to the top of the floatt 10 is an upwardly extending bracket 11. This bracket is generally in the form of an L, with the base secured to the center of the top of the float 10 and the upwardly extending body of the L generally parallel to and laterally to one side of the vertical center axis of the float. The base of the bracket is extended and turned back on itself in the form of a U. Extending within the bracket base U formation there is a flat spring 12, also in the general form of a U, with one leg secured to the bracket 11 and float 10 and the other leg overlying the center of the float for flexing movement in the general directions of the center axis of the float. Thus the U form of the bracket base forms a protective limit stop for the spring 12.

The bracket 11 serves as one terminus of a chain connection arrangement which will be described later herein.

The other terminus of the chain connection arrangement is in the form of a sector unit, generally indicated at 13. At the right of this unit, there is a rotatable shaft 14 to which the sector unit is rigidly secured by a chucklike arrangement as indicated by the split sleeve 14a and nut 14b. The shaft 14 lies above and to one side of the float 10.

The shaft 14 is rotated by up and down movement of the float 10, and the rotation of the shaft is used to perform whatever instrument function is desired in an arrangement for recording, indicating or controlling, as related to the variable condition whose changes result in the up and down movement of the float 10.

The sector unit 13 comprises a two piece support arm 15 extending from the rotary shaft 14 toward the bracket 11 and an operating face member 16, extending vertically beside the bracket 11, and curved on a radius from the rotary shaft 14 as a center. The two parts of the arm 15 are held together by bolts 15a mounted through slightly oversize openings, and a cam bolt 15b is provided for slight adjustments in the length of the arm 15.

As may be seen by reference to Figures I, II, and V, the operating face member 16 of the sector 13 is, in cross section, in the form of a trough, with the mouth of the trough facing the bracket 11. As previously mentioned, the bracket 11 and the sector unit 13 are connected by a chain arrangement. There are three separate chain lengths involved. Their connection to the bracket 11 is shown in Figures I and VI, their connection to and arrangement on the sector operating face member 16 is shown in Figure II, and the preferred construction of the chain is illustrated in Figure III.

As shown in Figure III, the chains are ball type in construction, and very flexible. These chains are known commercially as "bead" chains. The balls 19 are connected by smaller diameter tubes 20 with enlarged ends 21 within the balls. The balls 19 are split, as indicated by the slot 22, for assembly purposes.

As a connection to the bottom of the bracket 11, a single chain 17 has one end secured to the free end of the spring 12 at a point on the vertical center axis of the float 10. This chain extends over the curved, plain surface of the sector operating face, that is, the bottom of the trough, and is laterally centerally located thereon. This chain 17 terminates at the top end center of the sector operating face and is secured thereto by dropping the chain into a slot 18, see Figure V, which receives the diameter of the connectors between the balls of the chain but not the diameter of the balls. Each chain end connection is made in a slot like 18, as above.

In connection to the top of the bracket 11, there are two chains 23, one on either side of the chain 17. The chains 23 are secured at the top of the bracket 11 to an adjustable connector 24, shown in Figure VI. The connector 24 is adjustable vertically on the bracket 11 by means of a slot 24a and a lock screw 25 to provide the desired tension in the chains. The two chains 23, see Figure II, extend over the operating face of the sector 13, and are again secured, this time to the bottom end of the sector face, Figure II, by means of slots 26.

A particular feature of this invention is the provision of ball chains lying on a laterally flat sector surface without lateral restraint by the sector except for that afforded by the side walls of the operating face cross section. The chains are formed with the balls close together for flexibility and the balls may roll laterally on the sector operating face.

Thus the float 10 may freely move sufficiently laterally to find its natural floating position because of the flexibility of the chains 17 and 23, and their ability to roll laterally on the sector operating face. The sector 13 is positively driven in both directions by this chain arrangement with the spring 12 taking up any connection looseness.

A further advantage of the use of the chain structure as in this invention is that there is no necessity of laterally aligning the balls of the parallel ball chains. This necessity is a factor of disadvantage in certain prior art link chain structures. The maintenance of such lateral alignment as well as producing the initial alignment is a problem which the present invention avoids since ball chains have substantial freedom and uniformity in lateral bending movement, without particular lateral alignment of the individual parts of the parallel chains.

In providing a rigid connection between the sector 13 and the rotary shaft 14, difficulties have arisen because of the small size and delicacy of the shaft 14 in most of the applications of this type of device. One form of connection is shown in Figures I and V, and another possible connection arrangement is shown in Figure IV. In this latter structure a connecting arm 27, comparable to arm 15, Figure I, is provided with an opening therethrough as at 28 to receive the shaft 14 in close fitting relation. A slot 29 is formed in the arm 27 in the direction of the axis of shaft 14 and a side portion of the shaft opening 28 connecting with the slot 29 so as to allow a portion of the shaft 14 to protrude into the slot 29.

A wedge 30 fits into the slot 29 for movement in and out of the slot in a direction transverse to the axis of the shaft 14. The wedge 30 has a tapered surface 31 for engaging the protruding portion of the rotary shaft with increasing pressure as the wedge is moved progressively inward of the slot 29. A differential screw 32 is threaded through the arm 27 into the slot 29 and into the wedge 30. There is a fine thread on the larger diameter portion of the screw, in the arm portion and a coarser thread on the smaller diameter portion of the screw, in the wedge. As the screw 32 is turned, the difference in threads causes the wedge to move in or out of the slot 29. Thus a connection is provided which is capable of ready assembly or disassmbly and yet affords a tight and secured connection. As a measure to retain the wedge 30 in the slot 29, a portion of the wedge wall is cut away as at 33 and a pin 34 embedded in the arm 27 so as to protrude into the wedge cut away 33.

In this fashion an extreme adjustment of the screw 32 does not eject the wedge from the slot, since the full width portion of the wedge above the cut away would engage the pin at such extreme adjustment and prevent such ejectment.

I claim:
1. For use in industrial instruments of the type wherein a manometer is made responsive to a differential pressure which is measured by means of the movement of a float that floats on the liquid in one arm of the manometer, mechanism for translating the float movement into precisely corresponding rotary movement of a horizontally disposed shaft while permitting free lateral movement of the float, said mechanism comprising an upright bracket secured to said float, a sector having a smooth curved surface, said sector being secured to said shaft with the axis of said shaft substantially at the center of curvature of said curved surface, an assembly of universally flexible ball chains interconnecting said bracket and said sector, said ball chains being of the type wherein the elements can swivel relative to one another, at least one of said chains being connected to an upper portion of said bracket and a lower portion of said sector and at least one of said chains being connected to a lower portion of said bracket and an upper portion of said sector, the chains of said assembly being laterally spaced from one another whereby they can roll laterally over the curved surface of said sector to permit a limited amount of free lateral movement of said float.

2. Mechanism according to claim 1 and wherein the curved surface of said sector is channel-shaped and the sides of the channel are spaced from the outer chains of said assembly and act as stops to limit the lateral rolling movement of the chains of said assembly.

References Cited in the file of this patent

UNITED STATES PATENTS

| Number | Name | Date |
|---|---|---|
| 352,878 | Loomis et al. | Nov. 16, 1886 |
| 712,147 | Myers | Oct. 28, 1902 |
| 1,686,263 | Bristol | Oct. 2, 1928 |
| 1,808,207 | Cook | June 2, 1931 |
| 2,242,603 | Weldy | May 20, 1941 |
| 2,481,496 | Brewer | Sept. 13, 1949 |